(12) United States Patent
Tailor et al.

(10) Patent No.: US 9,491,691 B2
(45) Date of Patent: Nov. 8, 2016

(54) BLUETOOTH ASSISTED COOPERATIVE WIFI SCAN AND ROAM

(71) Applicant: Laird Technologies, Inc., Earth City, MO (US)

(72) Inventors: Mahendra Tailor, Wembley (GB); Steve deRosier, Fairfield, CA (US); Daniel B. Kephart, Jr., Cuyahoga Falls, OH (US)

(73) Assignee: Laird Technologies, Inc., Earth City, MO (US)

( * ) Notice: Subject to any disclaimer, the term of this patent is extended or adjusted under 35 U.S.C. 154(b) by 54 days.

(21) Appl. No.: 14/490,156

(22) Filed: Sep. 18, 2014

(65) Prior Publication Data
US 2016/0081009 A1    Mar. 17, 2016

Related U.S. Application Data

(60) Provisional application No. 62/048,990, filed on Sep. 11, 2014.

(51) Int. Cl.
*H04W 4/00* (2009.01)
*H04W 48/16* (2009.01)
(Continued)

(52) U.S. Cl.
CPC ............. *H04W 48/16* (2013.01); *H04W 4/008* (2013.01); *H04W 8/26* (2013.01); *H04W 48/20* (2013.01)

(58) Field of Classification Search
CPC ....... H04W 80/04; H04W 8/26; H04W 8/02; H04W 8/08; H04W 8/12
USPC ............................................. 455/432.1–434
See application file for complete search history.

(56) References Cited

U.S. PATENT DOCUMENTS

| 5,717,688 A | 2/1998 | Belanger et al. |
| 6,343,218 B1 | 1/2002 | Kaneda et al. |

(Continued)

FOREIGN PATENT DOCUMENTS

| KR | 1020120104677 | 9/2012 |
| KR | 10-2013-0128777 | 11/2013 |

(Continued)

OTHER PUBLICATIONS

International Search Report and Written Opinion from PCT/US2015/049105 which claims priority to the instant application; dated Dec. 17, 2015; 10 pages.

(Continued)

*Primary Examiner* — Ronald Eisner
(74) *Attorney, Agent, or Firm* — Harness, Dickey & Pierce, P.L.C.

(57) ABSTRACT

According to various aspects, exemplary embodiments are disclosed of systems and methods related to Bluetooth assisted cooperative scan and roam for wireless networks. In an exemplary embodiment, a cooperative scan and roam Bluetooth system generally includes one or more Bluetooth nodes configured to transmit node roam table data and/or a universally unique identifier (UUID) to one or more client devices having a stored client roam table and connected to at least one of multiple access points of a wireless network. This allows the one or more client devices to update their stored client roam tables based on the transmitted node roam table data and/or roam table information obtained from a server and/or cache including multiple roam tables, based on the UUID.

18 Claims, 6 Drawing Sheets

(51) Int. Cl.
*H04W 48/20* (2009.01)
*H04W 8/26* (2009.01)

(56) References Cited

U.S. PATENT DOCUMENTS

| | | |
|---|---|---|
| 6,748,195 B1 | 6/2004 | Phillips |
| 7,480,288 B2 | 1/2009 | Chaar et al. |
| 7,710,930 B2 | 5/2010 | Kwak |
| 7,995,547 B1 | 8/2011 | Barratt |
| 8,040,219 B2 | 10/2011 | Haartsen et al. |
| 8,116,758 B2 | 2/2012 | Mlinarsky et al. |
| 8,370,523 B1 | 2/2013 | Slaughter et al. |
| 8,396,485 B2 | 3/2013 | Grainger et al. |
| 8,457,673 B2 | 6/2013 | Thomas et al. |
| 8,630,640 B2 | 1/2014 | Das et al. |
| 9,301,249 B2 | 3/2016 | Yeh et al. |
| 2005/0288027 A1 | 12/2005 | Cho et al. |
| 2008/0293411 A1* | 11/2008 | Hinton ............ H04L 63/0407 455/435.1 |
| 2009/0052382 A1* | 2/2009 | Stephenson ........ H04W 16/14 370/329 |
| 2009/0131079 A1 | 5/2009 | Sekhar |
| 2009/0215398 A1 | 8/2009 | Adler et al. |
| 2010/0056184 A1* | 3/2010 | Vakil ................ H04W 4/02 455/456.5 |
| 2011/0122821 A1 | 5/2011 | Laroia et al. |
| 2011/0149739 A1 | 6/2011 | Sarkar |
| 2011/0167482 A1 | 7/2011 | Touve et al. |
| 2012/0079018 A1 | 3/2012 | Rottler et al. |
| 2012/0230312 A1* | 9/2012 | Masuda ............ H04L 63/08 370/338 |
| 2013/0016696 A1 | 1/2013 | Adjakple et al. |
| 2013/0070959 A1 | 3/2013 | Pagonis et al. |
| 2013/0301606 A1 | 11/2013 | Sengupta et al. |
| 2014/0086101 A1 | 3/2014 | Barkan |
| 2014/0087752 A1 | 3/2014 | Zhu et al. |
| 2015/0072710 A1 | 3/2015 | Joe et al. |
| 2015/0245282 A1 | 8/2015 | Kim et al. |
| 2015/0256963 A1* | 9/2015 | Dahlen ............ H04W 4/008 455/41.2 |

FOREIGN PATENT DOCUMENTS

| | | |
|---|---|---|
| TW | M450170 U | 4/2013 |
| TW | 201421951 A | 6/2014 |
| WO | WO2014/027829 | 2/2014 |
| WO | WO2014/128527 | 8/2014 |

OTHER PUBLICATIONS

"3GPP: TSG CT; Evolved Packet System (EPS); Mobility Management Entity (MME) and Serving GPRS Support Node (SGSN) related interfaces based on Diameter protocol (Release 11)"; 3GPP TS 29.272 V11.10.0; Jun. 30, 2014; 124 pgs.

Taiwan Office Action (and its English translation) for Taiwan application No. 104129913 filed Sep. 10, 2015 which claims priority to the instant application; dated Jul. 19, 2016, 10 pages.

\* cited by examiner

| BSSID | Preference Value | RSSI | dRSSI | Channel |
|---|---|---|---|---|
| xx:xx:xx:xx:xx:X1 (connected to) | 100 | -60 | 3 | 1 |
| xx:xx:xx:xx:xx:X2 | 50 | -75 | 4 | 5 |
| xx:xx:xx:xx:xx:X3 | 20 | -90 | 5 | 11 |

| BLE Node UUID | RSSI |
|---|---|
| UU:UU:UU......U1 | -50 |
| UU:UU:UU......U2 | -55 |
| UU:UU:UU......U3 | -67 |

Roam Table

| Entry | Roam Util | bssid | rssi | rssidt | last rssi | util | bias | from |
|---|---|---|---|---|---|---|---|---|
| 0 | 735 | 28:c6:8e:2b:5e:02 | 49 | 0 | 49 | 15 | 0 | scan |
| 1 | 966 | 40:2c:f4:d3:9e:b5 | 35 | 1 | 70 | 50 | 1 | ble |
| | | | | | | | | |

FIG. 2

| Network ID | # BSSID for Network ID | BSSID | Chan | LQ Metric | BSSID | Chan | LQ Metric | Network ID | # BSSID for Network ID | BSSID | Chan | LQ Metric | ... |
|---|---|---|---|---|---|---|---|---|---|---|---|---|---|
| | | | | | | | | | | | | | ... |

FIG. 3

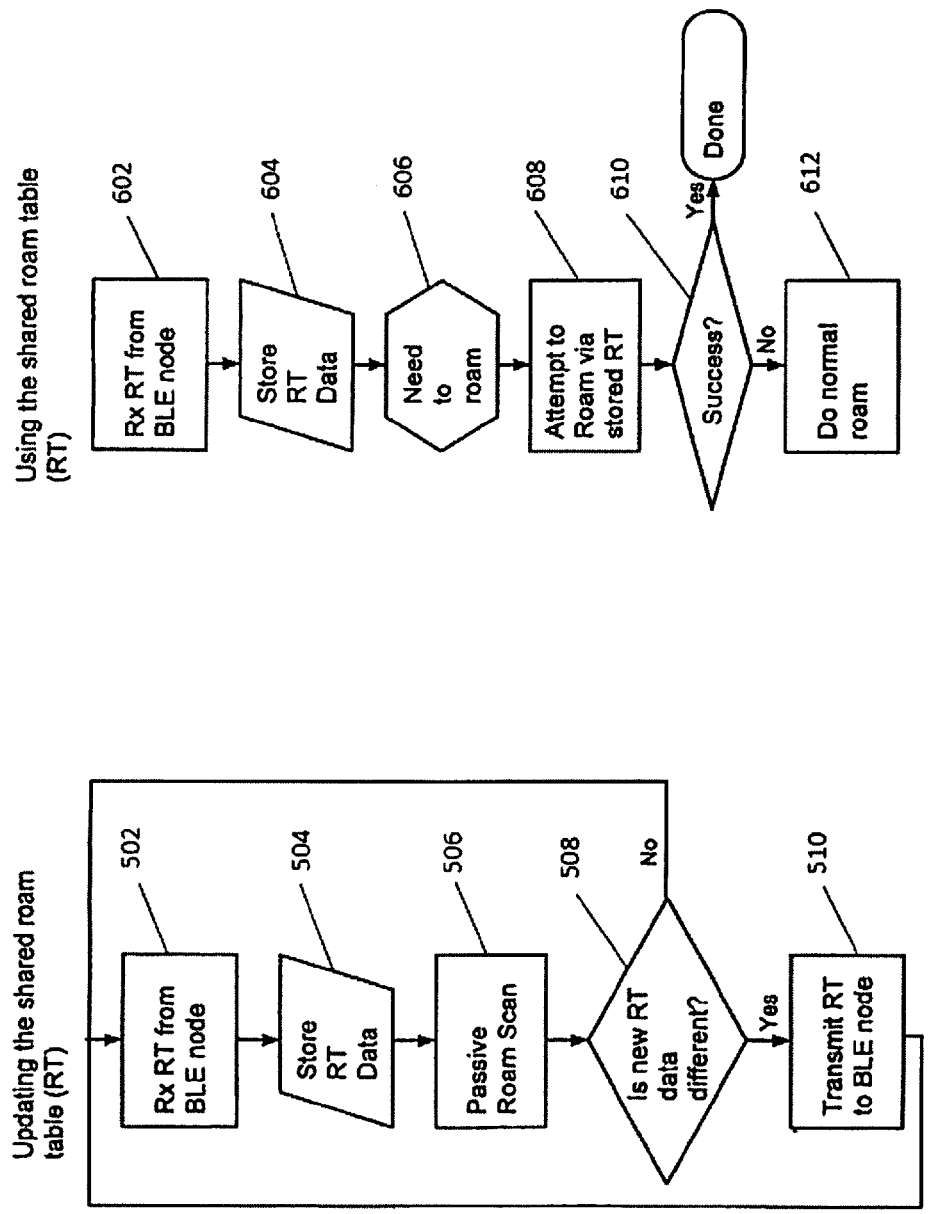

BLUETOOTH ASSISTED COOPERATIVE WIFI SCAN AND ROAM

CROSS-REFERENCE TO RELATED APPLICATION

This application claims the benefit of U.S. Provisional Application No. 62/048,990 filed on Sep. 11, 2014. The entire disclosure of the above application is incorporated herein by reference.

FIELD

The present disclosure generally relates to systems and methods for BLUETOOTH assisted cooperative WiFi scan and roam.

BACKGROUND

This section provides background information related to the present disclosure which is not necessarily prior art.

BLUETOOTH is a wireless technology standard that may be used to transfer data over short distances using radio waves in the ISM (Industrial Scientific and Medical) band from 2.4 Gigahertz (GHz) to 2.485 GHz. BLUETOOTH low energy (BLE) (e.g., BLUETOOTH Smart) is a related technology for providing communications with reduced power consumption.

Separately, wireless networks (e.g., WiFi) may be deployed in locations and may have more than one wireless network access point (AP). Client WiFi modules may evaluate and track signals from APs in order to find the best AP to choose when it is time for the client WiFi module to roam.

SUMMARY

This section provides a general summary of the disclosure, and is not a comprehensive disclosure of its full scope or all of its features.

According to various aspects, exemplary embodiments are disclosed of systems and methods related to BLUETOOTH assisted cooperative scan and roam for wireless (e.g., WiFi) networks. In an exemplary embodiment, a cooperative scan and roam BLUETOOTH system generally includes one or more BLUETOOTH nodes having a stored node roam table. The one or more BLUETOOTH nodes are configured to transmit node roam table data including information related to potential access points of one or more wireless networks to one or more client devices. This allows the one or more client devices to update their stored client roam tables based on the transmitted node roam table data.

In another exemplary embodiment, a method of providing cooperative roaming for one or more client devices in a wireless network is disclosed. The method generally includes positioning one or more BLUETOOTH nodes in one or more wireless networks, each BLUETOOTH node having a stored node roam table and configured to transmit node roam table data including information related to potential access points of one or more wireless networks to one or more client devices. This allows the one or more client devices to update their stored client roam tables based on the transmitted node roam table data.

In a further exemplary embodiment, a method of cooperative roaming in a wireless network is disclosed. The method generally includes receiving, at a BLUETOOTH node having a stored node roam table, client roam table data from a first client device. The client roam table data includes information relative to one or more potential access points of the wireless network. The method also includes updating the stored node roam table based on the received client roam table data, and transmitting the updated node roam table data to a second client device. This allows the second client device to update its stored client roam table.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A is an example roam table according to one aspect of the present disclosure;

FIG. 1B is another example roam table according to another aspect of the present disclosure;

FIG. 2 is yet another example roam table according to another aspect of the present disclosure;

FIG. 3 is an example transmission of roam table data according to another aspect of the present disclosure;

FIG. 5 is a flowchart of an example method of updating a shared roam table;

FIG. 6 is a flowchart of an example method of using a shared roam table;

DETAILED DESCRIPTION

Figure 4:
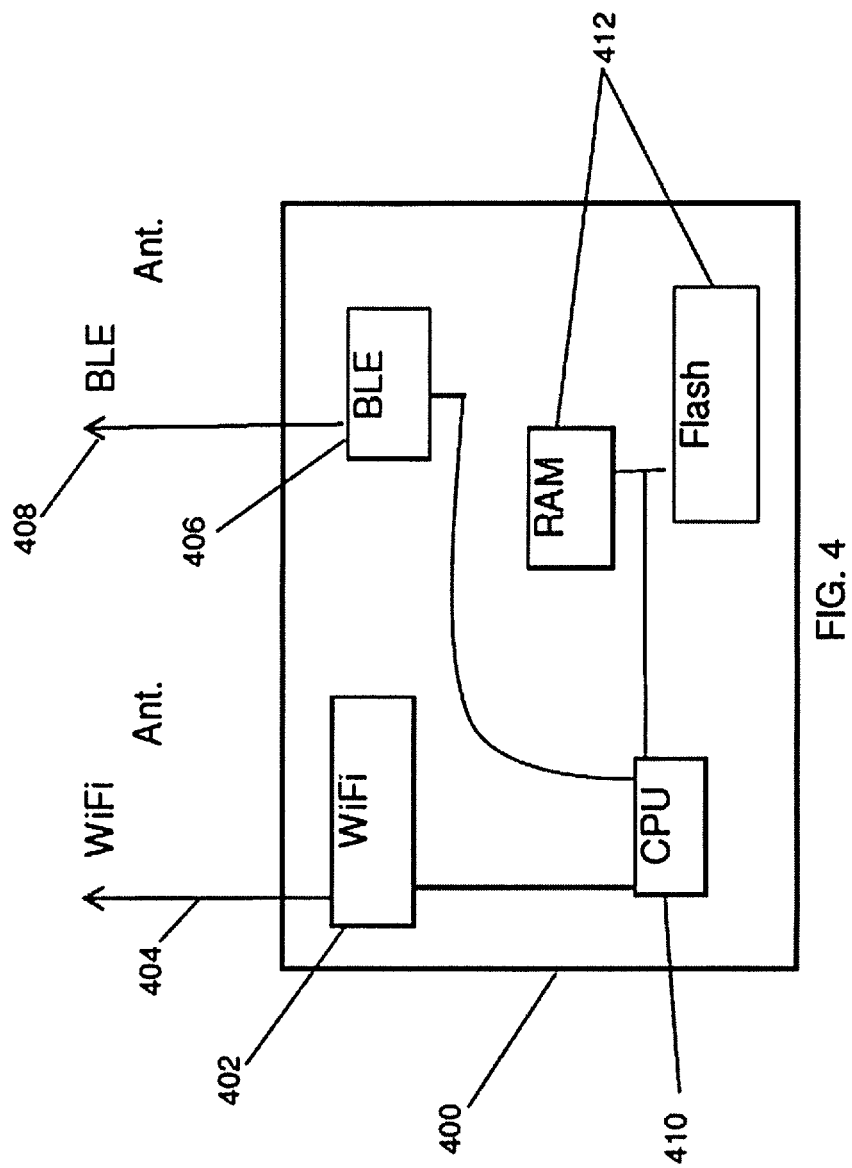
FIG. 4 is an example client module having WiFi and BLUETOOTH connectivity.

Example embodiments will now be described more fully with reference to the accompanying drawings.

WiFi roaming (broadly, wireless network roaming) may involve a client WiFi device performing all roaming evaluation. The client device may periodically drop off of an access point (AP) of a wireless network (e.g., a WiFi network, wireless local area network (WLAN), etc.) and scan a set of relevant channels of the network. The client device takes the AP beacons it hears and performs an evaluation algorithm. If the client device deems the AP suitable, it may be pushed into a roam table. When the client device is performing the off-channel listening it may be unable to send or receive data from the AP to which the client device is supposed to be connected.

When the client device starts to get a marginal signal strength from the AP it is connected to, the client device may attempt to disconnect from the AP and try to connect to a better AP as determined from its roam table. This may be referred to as a roam. If the client device is unable to find a suitable entry in its roam table and the signal strength of the AP to which the client device is connected drops too far to continue passing data, the client device may go into an active scan state where the client device begins sending probe requests across all channels in an effort to find a usable AP. If the client device gets a good enough response from an appropriate AP, the client device may roam to that appropriate or usable AP.

Disclosed herein are exemplary embodiments systems and methods related to or including cooperative scanning and roaming in a wireless network, using BLUETOOTH communications. In one example embodiment, one or more BLUETOOTH nodes are configured to transmit node roam table information to one or more client devices having a stored client roam table and connected to at least one of multiple access points of a wireless network, thereby allowing the one or more client devices to update their stored client roam tables based on the transmitted node roam table information. The BLUETOOTH nodes may have a stored node roam table including information related to potential access points (APs) of one or more wireless networks, and may be configured to transmit node roam table data to one or more client devices having a stored client roam table.

In some example embodiments, one or more BLUETOOTH nodes include a stored UUID (universally unique identifier) that may be a reference (e.g., a BLUETOOTH identifier reference) to a node roam table including information related to potential access points (APs) of one or more wireless networks. The referenced node roam table may be stored on a server accessible via an existing connection, a reference to a cache in a wireless device consisting of many roam tables, etc. The one or more BLUETOOTH nodes may be configured to transmit references to the node roam table data (e.g., a UUID) to one or more client wireless devices having a stored client roam table, thereby allowing the one or more client devices to update their stored client roam table(s) based on the data from the server, in the client device stored cache, etc. For example, the BLUETOOTH nodes may use small advert packets to convey information, with the BLUETOOTH nodes only having UUIDs stored, and the UUIDs are used as keys for lookup in a central database.

Some example embodiments may utilize BLUETOOTH low energy (BLE) modules to enhance scan and roam features of a client WiFi device. The client WiFi device may include an integrated BLE radio, which can be used to scan for BLE beacons. The client WiFi devices may send their scan/roam tables to the BLE beacon modules, to a server which stores the updated roam tables, etc., thereby allowing other client WiFi devices to retrieve the information. In this manner, client WiFi devices may share their scan/roam table data based on location and cooperatively minimize (or at least reduce) the time necessary for each individual client WiFi device to keep its table up to date. Some embodiments may increase average throughput and opportunities for power-saving sleep time at the client WiFi devices by reducing the amount of passive scanning each client WiFi device must perform. Storing updated client roam tables at a server may result in a dynamic system in which a roaming table analyzer, algorithm, etc. can be used on the server to detect trends, make adjustments by learning, etc. A learning algorithm may be a neural network algorithm.

Some of the example embodiments described herein may include BLE beacons that give location information including details about access points in a wireless network. This location information may be used by client WiFi devices having a BLE module by integrating the location information into an algorithm to evaluate the best AP to switch to at any given location. This may allow for more accurate, robust, and quicker roaming given the location information supplied over the BLE channel.

As another example embodiment, one or more BLE beacons may be distributed in a wireless network, with each beacon programmed to broadcast a 16 byte UUID (which will be different for each beacon). The beacon will also broadcast (e.g., in the same payload as the UUID) a constant RSSI value which may correspond to the value a client WiFi device receiver would get when positioned a set distance from the beacon (e.g., about 2 yards). The beacon may continuously broadcast this payload information. A receiving device (e.g., client WiFi device) may include a BLE receiver for receiving broadcast adverts from the one or more BLE beacons. The receiving device may be assumed to be associated with at least one WiFi access point of the wireless network, and may therefore have access to information in an Internet cloud (e.g., a server coupled to the wireless network via the Internet, etc.). The receiving device may use the broadcast UUIDs, calibrated RSSI values, received BLE beacon RSSI values, received access point RSSI values, etc. to query a server for information indicative of the best access point for the receiving device to be connected to. The server may be updated with roaming table information by the receiving WiFi device so that the roaming table information is kept current. The server may use this received updated roaming table information to learn and feedback to the WiFi device information about the best access point to be connected to in the vicinity of the location of the WiFi device. Some WiFi devices may be able to cache the suggestions provided by the server in the local memory of the WiFi device to be used later to make quicker decisions in the event of disconnection from the server. This may allow for easier commissioning of a site by only requiring strategically fixing BLE nodes liberally around a wireless network site, and using a specially adapted WiFi device to register the BLE nodes with the server.

With reference to the figures, FIG. 1 illustrates an example roam table 100 according to some aspects of the present disclosure. A client WiFi device (e.g., laptop computer, desktop computer, tablet computer, smartphone, WiFi enabled equipment, etc.) may periodically scan a set of channels that determine how many different potential instances (e.g., access points, etc.) of a given WiFi network identification or service set identification (SSID) exist. For each potential instance or basic service set identification (BSSID) found that matches the SSID, the received signal strength indicator (RSSI) and its channel may be saved into the roaming candidate table 100. The time in which the BSSID was last seen may also be saved. Other measures can be calculated and saved for each BSSID, including the derivative of the current RSSI (dRSSI in table 100), previous RSSIs, etc. From this roam table 100, a preference value for each BSSID may be calculated to determine the optimal roam candidate. Therefore, when the client needs to roam, the client can try the candidate with the highest preference value in the table 100.

The client WiFi device uses the roam table 100 when the BSSID it is currently connected to has its RSSI drop below a certain programmed or predetermined threshold (e.g., −75, −80, −85, etc.). Once this occurs, the client WiFi device may attempt to roam if the client WiFi device has a valid roam table candidate. If the client WiFi device can't connect to a roam table candidate (or doesn't have a valid roam table candidate in its table), the client WiFi device may scan and update the roam table 100 and use the preference values to determine if a better BSSID exists. If one does, the client WiFi device will attempt to roam to that BSSID. If one does not exist, the client WiFi device may scan more frequently until a better BSSID is found or the current BSSID's RSSI improves and it is above the programmed threshold. Although FIG. 1 illustrates certain parameters as stored in the roam table 100, other embodiments may have more, less, and/or different parameters corresponding to an AP.

Additionally, or alternatively, the example roam table 100 may include a BLE node UUID and a corresponding RSSI value as illustrated in FIG. 1B. The roam table 100 may include one or more rows each containing at least two fields. A first field (BLE Node UUID) contains a UUID as advertised by a BLE node and the RSSI as seen by the BLE receiver in a client WiFi device. There may be one row for each BLE node visible by the client WiFi device. Then, based on the RSSI values for the BLE nodes, an estimate can be made about the location of the WiFi device to determine a roaming table to use.

FIG. 2 illustrates another example roam/scan table 200 according to some aspects of the present disclosure. As wireless network signals are received by a client WiFi device (e.g., an 802.11 a/b/g/n device, etc.), a signal may be processed and the RSSI of the signal determined, which may indicate how strong or weak the signal is. The determination of RSSI may be performed partially by an internal radio circuitry of an 802.11 chip, which may provide raw metrics, partially by firmware in the chip that processes the metrics to determine the RSSI value, etc. Each received packet may have an RSSI value evaluated.

When the client WiFi device goes off channel for a scan to update the roam table 200, the client WiFi device may listen for beacons from other nearby APs. For any APs for which the client WiFi device hears a beacon, the client WiFi device may evaluate if the AP is one that the client WiFi device could roam to (e.g., has the same SSID so it can stay in the same network, etc.). If the AP is a valid roam candidate, it may be stored in the roam table 200 along with calculated RSSI values for the AP. When the client WiFi device begins to receive a marginal signal strength (e.g., low RSSI) from the AP to which it is connected, the client WiFi device may try to disconnect from that AP and try to connect to a better AP as determined from the RSSI and the RSSIdt values in its roam table 200. If successful, this may be referred to as a roam.

As shown in FIG. 2, the example roam table 200 may include an entry number, a roam utility indicating the quality of the AP for roaming to, a BSSID indicating the media access control (MAC) address of the AP, an RSSI indicating the most recent signal strength of the AP, a derivative of the RSSI (rssidt) indicating the rate of change of the RSSI to show whether the signal is getting stronger or weaker, a most recent RSSI value (last rssi), a utility measurement (util), a bias parameter, a column indicating whether the row information was obtained from the client WiFi device or a BLUETOOTH node (from), etc. Although FIG. 2 illustrates certain roam table parameters, other embodiments may include more, less, and/or different parameters corresponding to an AP.

The example roam/scan tables 100 and 200 may be stored in a client WiFi device, a BLUETOOTH node, a server on the network, etc. using any suitable implementation, including a table stored in memory of the device and/or node (e.g., in random access memory (RAM), read-only memory (ROM)), preprogrammed on a chip of the device and/or node, etc.).

According to some aspects of the present disclosure, a client WiFi device may gather roam table information via a passive scan, active scan, etc. and transmit at least some of the roam table data over BLUETOOTH communication to a BLUETOOTH node (e.g., a BLE beacon device). The BLUETOOTH node may store the received dynamic roam table data and retransmit the data on request (e.g., via a temporary connection between the BLUETOOTH node and the client WiFi device), etc. For example, a BLE beacon may only be capable of sending about 31 bytes in total any may not be capable of sending the dynamic roam table data via a broadcasted advert, but a BLUETOOTH node may sent the information via a temporary connection. When other client WiFi devices (e.g., 802.11 and BLE nodes, etc.) move into the range of the BLUETOOTH node that is storing the roam table data, the client WiFi device can listen to the roam table data from the BLUETOOTH node and merge the data into the roam table of the client WiFi device. Alternatively, or in addition, client WiFi devices may obtain this information from a server if BLUETOOTH nodes (e.g., BLUETOOTH beacons) advertise references during a broadcast advert. This cooperative dynamic scan and roam may allow client WiFi devices to spend less time off-channel doing scans to maintain their roam tables, thereby reducing roam scans significantly while still maintaining up to date roam tables.

FIG. 3 illustrates an example packet 300 from a BLUETOOTH node including roam table data (e.g., during a temporary connection between the BLUETOOTH node and a client WiFi device). The example packet 300 may include a list of SSIDs that have been detected in the wireless network area (e.g., a list of potential access points, etc.). In some embodiments, the SSID can be referenced by a Network ID which can be a single nibble or byte. A client WiFi device may then use a look up table (LUT) to determine what SSID the Network ID corresponds to. For each SSID and/or Network ID, the number of BSSIDs (e.g., access points, etc.) and a list of those BSSIDs may follow. Each BSSID may have its own respective channel and a link quality (LQ) metric after it. The last two bytes only may be used to limit the space needed for each BSSID. The channel and LQ metric could only use one byte each. In other embodiments, more, less, and/or different parameters may be included in the packet 300, and each parameter may occupy more or less bytes, nibbles, etc. in the packet 300.

The LQ metric may be determined based on any suitable approach, and may depend on whether the BLE beacon includes and/or is coupled to a WiFi module (e.g., wireless receiver, wireless network client, etc.). If the BLUETOOTH node includes a WiFi module, the WiFi module can scan and/or attempt connection with access points to determine the LQ metric. If the BLE beacon does not include a WiFi module, other client WiFi devices in the wireless network area can send their own roam table data to the BLUETOOTH node, including which network the client WiFi device is connected to. The BLUETOOTH node can then update the stored node roam table and calculate an LQ metric for each access point based on the received client roam table data. Alternatively, or in addition, a BLUETOOTH node may be manually provisioned with a full list of SSIDs and BSSIDs when it is installed. For example, a technician with information about the wireless networks and available access points in the area may input roam table data and/or LQ metric information to a BLUETOOTH node when it is installed in the network area. Alternatively, or additionally, a technician may update a server with information about the wireless networks and available access points (e.g., if the BLE beacon sends references to the server information during a broadcast advert, etc.)

As described above, a BLUETOOTH beacon (or other BLUETOOTH communication module) may store node roam table information at the BLUETOOTH beacon and transmit the stored note roam table data to client devices (e.g., over a BLUETOOTH connection). The transmitted node roam table may include any suitable information corresponding to wireless networks, access points, signal strength, etc., and may include at least one of a network identifier, a channel corresponding to a potential access point, a link quality metric corresponding to a potential access point, etc. The link quality metric may indicate a roam quality of the corresponding potential access point.

FIG. 4 illustrates an example client WiFi device 400. The client WiFi device 400 may include a WiFi module 402 (e.g., a wireless network adapter, wireless receiver, 802.11 device, etc.). The WiFi module 402 may include a WiFi antenna 404 configured to transmit and/or receive wireless network communication signals. The device 400 may also include a BLUETOOTH node 406, which may comprise any suitable BLUETOOTH instance, including a BLUETOOTH chipset, device, module, beacon, etc. The BLUETOOTH node 406 may include a BLUETOOTH antenna 408 configured to communicate using any BLUETOOTH protocol (e.g., BLUETOOTH 4.0, BLUETOOTH 4.1, BLUETOOTH low energy (BLE), etc.). Although not shown, BLUETOOTH nodes deployed in the network to provide node roam table data to client WiFi devices 400 may comprise any suitable BLUETOOTH node as described above, and may communicate using any suitable BLUETOOTH protocol as describe above. For example, each BLUETOOTH node deployed in the wireless network and configured to provide node roam table data to client WiFi devices may comprise a BLE beacon.

The client WiFi device 400 may further include a processor 410 and memory 412 (e.g., flash memory, random access memory (RAM), etc.). The processor 410 may be configured to operate the client WiFi device, including transmitting and receiving wireless network and BLUETOOTH communication signals, scanning for access points, updating the stored client roam table data, etc. The memory 412 may be configured to store client roam table data, which may include example parameters described relative to example tables 100 and 200, a roam utility indicative of the roam quality of an access point, a media control access of the access point, a signal strength of the access point, a rate of change of the signal strength of the access point, a previous signal strength value of the access point, a location of origin of client roam table data (e.g., from a BLE beacon deployed in the network, from the client WiFi device 400 itself, etc.), etc. In some embodiments, the client WiFi device 400 may comprise a computing device, including a desktop computer, a laptop computer, a tablet computer, a smartphone, a wireless network adapter, a WiFi enabled device (e.g., a WiFi equipped medical device), etc.

According to some example embodiments, the client WiFi device 400 receiving node roam table data from a BLUETOOTH node, a server using a UUID from a BLE beacon as a lookup index, etc. may search the beacon packets for the SSID (or network ID corresponding to the SSID) the client WiFi device 400 is connected to. The client WiFi device 400 may then take each BSSID (e.g., access point, etc.) and either add the entry to its own client roam table or, if the BSSID is already in the client roam table, recalculate the preference value based on the LQ metric received from the BLE beacon. In some cases, the client WiFi device 400 could rely almost completely on the BLE beacon information to build its client roam table and only do a quick verification scan on one or two (or more) channels before performing a roam operation. This may allow higher throughput for the client WiFi device 400 and potentially faster roaming.

FIG. 5 illustrates an example flow chart for updating a client roam table. At 502, the client WiFi device receives node roam table data from a BLUETOOTH node, a server via a lookup reference based on a BLE beacon, etc. At 504, the client device stores the received roam table data in the client roam table. At 506, the client device performs a roam scan for access points in the wireless network. At 508, the client device compares the results of the roam scan with the received node roam table data. If the roam scan results are not substantially different from the received node roam table data, the client device completes the process and waits to receive the next transmission of node roam table data from the BLUETOOTH node. If the roam scan results are substantially different, at 510 the client device may transmit the roam scan result data to the BLUETOOTH node (and optionally store the update the stored client roam table data with the roam scan results). Upon receiving the scan result data, the BLUETOOTH node may update its own stored node roam table based on the received data.

FIG. 6 illustrates an example flow chart for using received node roam table data and stored client roam table data. At 602, the client WiFi device receives node roam table data from a BLUETOOTH node, a server via a lookup reference based on a BLE beacon, etc. At 604, the client device stores the received node roam table data in the client roam table. At 606, the client device determines a need to perform a roam operation if the signal strength of the access point the client device is currently connected to drops below a threshold. At 608, the client device performs a roam operation based on the node roam table data received from the BLUETOOTH node. At 610, the client device determines whether the roam operation was successful (e.g., whether the client device was able to connect to an access point having a suitable signal strength, based on the received node table data, etc.). If the client device roam operation was successful, the client device completes the roam operation and may wait to receive additional node roam table data from the BLUETOOTH node. If the roam operation was not successful, the client device performs a normal roam at 612 (e.g., passively and/or actively scans for additional access points to connect to, which may include updating its own stored client roam table based on the scan results, etc.).

Figure 7:
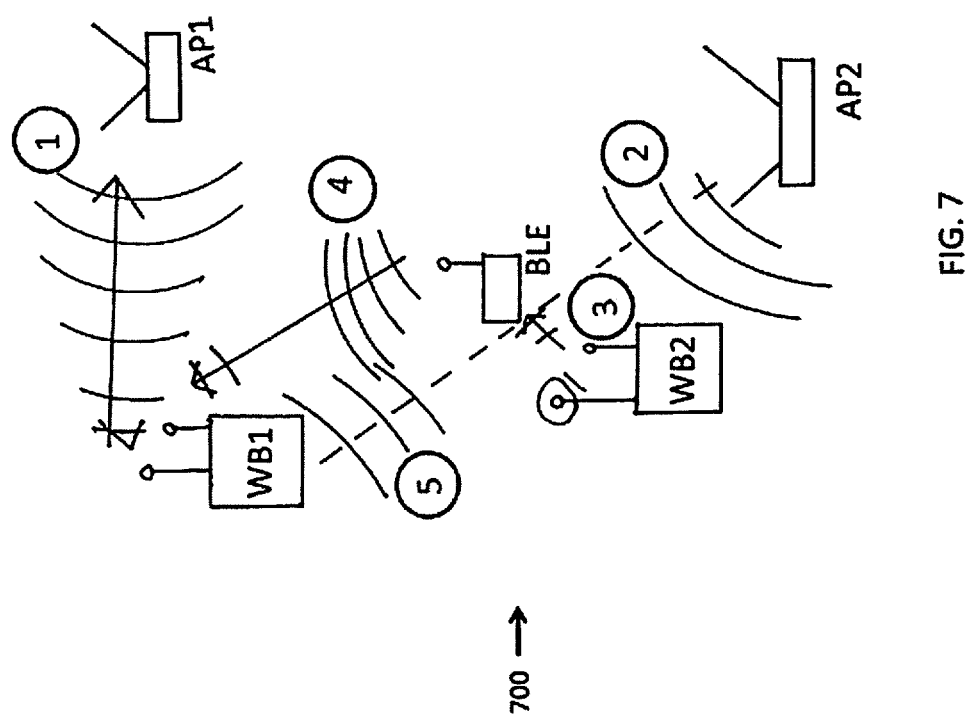
FIG. 7 is a diagram of an example BLUETOOTH assisted cooperative scan and roam system according to another aspect of the present disclosure.

FIG. 7 illustrates an example system 700 for cooperative BLUETOOTH assisted scan and roam in a wireless network. The system 700 includes two access points AP1 and AP2, two client WiFi devices WB1 and WB2, and a BLUETOOTH node BLE. At point 1, client device WB1 is connected to access point AP1. At point 2, client device WB2 detects access point AP2 during a scan operation. Client device WB2 may then add access point AP2 to the client roam table of client device WB2. At point 3, client device WB2 sends its client roam table data (including data recently acquired during its scan for access point AP2) to BLUETOOTH node BLE. BLUETOOTH node BLE stores the client roam table data received from client device WB2, including the roam table data regarding access point AP2.

At point 4, client device WB1 moves toward BLUETOOTH node BLE, and when it is within a proximity distance threshold, receives the stored node roam table data (including data corresponding to access point AP2) while it is busy passing data to access point AP1. At point 5, client device WB1 moves farther from access point AP1, determines the signal from access point AP1 is weak, and determines it could receive a better connection from access point AP2 (based on the node roam table data received from BLUETOOTH node BLE). Client device WB2 may then attempt to roam to access point AP2. In this example, client device WB2 cooperates with client device WB1 via BLUETOOTH node BLE, but passing roam table data to client device WB1 via the BLUETOOTH node BLE. The cooperative roam table process allows client device WB1 to learn of access point AP2 before it has to perform its own scan and roam of the whole wireless network.

Figure 8:
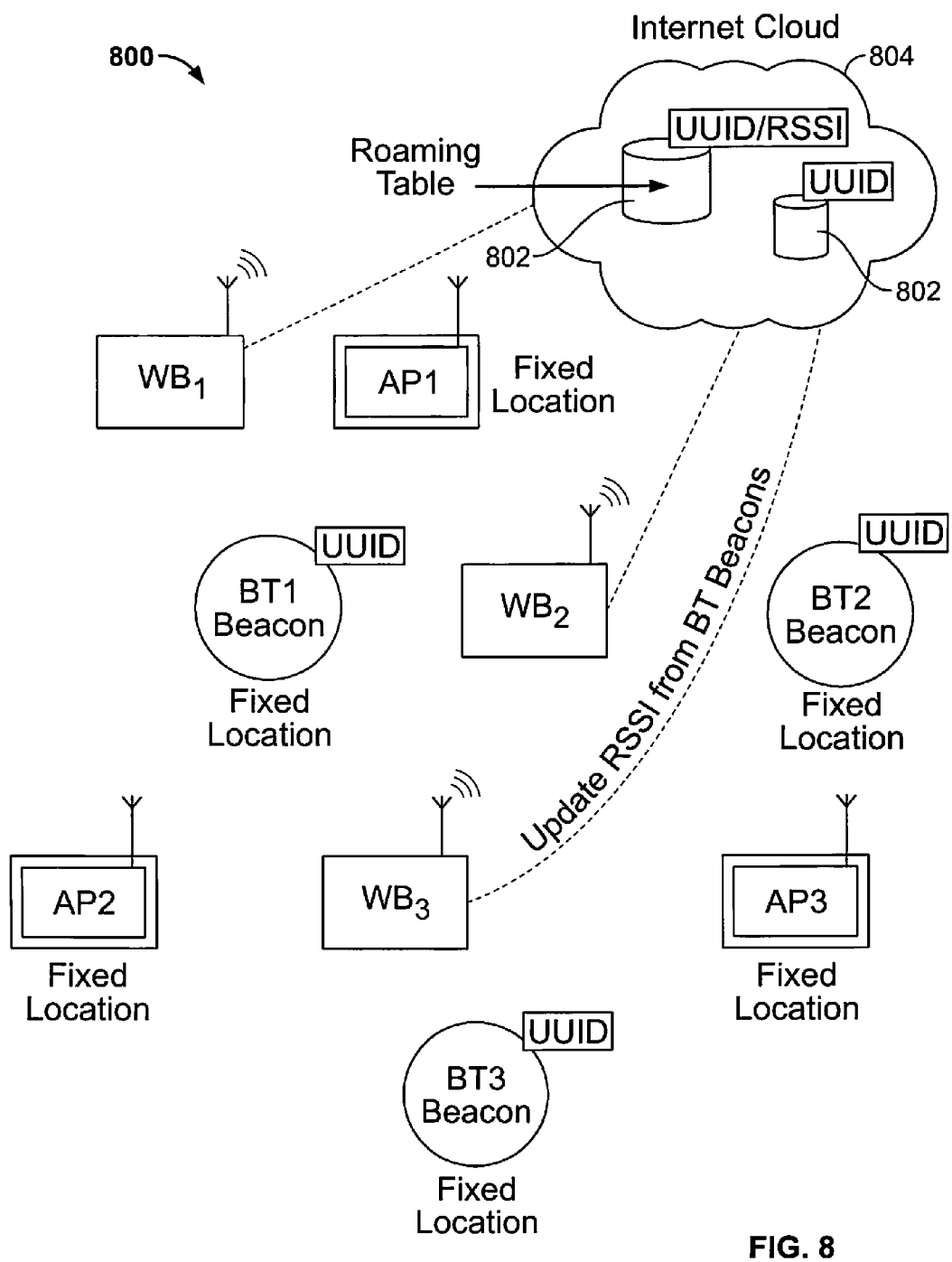
FIG. 8 is a diagram of another example BLUETOOTH assisted cooperative scan and roam system according to another aspect of the present disclosure.

FIG. 8 illustrates an example BLUETOOTH cooperative scan and roam system 800, according to another example embodiment of the present disclosure. In the system 800, roaming tables may be stored in one or more databases 802, which may be located in memory on an Internet cloud storage system 804, a server, etc.

As shown in FIG. 8, a wireless network may have access points AP1-AP3 distributed at fixed locations in the network. The wireless network also has BLUETOOTH beacons BT1-BT3 (e.g., BLE beacons) distributed at fixed locations in the network. Each BLUETOOTH beacon BT1-BT3 has a unique UUID associated with the respective beacon, and may be configured to broadcast its UUID along with an RSSI value a client device would receive when positioned a fixed distance from the BLUETOOTH beacon.

Client devices WB1-WB3 are distributed in the wireless network and capable of connecting to the wireless network via access points AP1-AP3. Client devices WB1-WB3 may store client roam table data corresponding to signal strengths of the potential access points AP1-AP3 in the wireless network, which may change based on the location of the client devices WB1-WB3.

The client devices WB1-WB3 may also be configured to receive broadcast signals from the BLUETOOTH beacons BT1-BT3. The client devices may then use the received broadcast information and communicate with database(s) 802 to receive roam table information. For example, database(s) 802 and/or client devices WB1-WB3 may include a lookup for each UUID corresponding to each BLUETOOTH beacon BT1-BT3. Based on RSSI value(s) from one or more of the BLUETOOTH beacons BT1-BT3, a client device and/or the database(s) 802 may be able to determine a location of the client device in the network, and thereby determine the best access point for the client device to connect to.

For example, client device WB1 may receive stronger RSSI values from BLUETOOTH beacon BT1 than from BLUETOOTH beacons BT2 or BT3 (e.g., the RSSI value from BT1 may be the highest, the RSSI value from BT1 may more closely correspond to the broadcast RSSI from BT1 as compared to the differences for BT2 and BT3, etc.). Based on the UUID lookup, the client device WB1 can then communicate with the database(s) 802, which determines that the client device WB1 is closest to access point AP1, and instructs the client device WB1 that the best access point to connect to would be access point AP1.

Thus, each client device WB1-WB3 may transmit any suitable information to the database(s) 802 including RSSI values from access points AP1-AP3, RSSI values for the broadcast signals from BLUETOOTH beacons BT1-BT3, UUIDs from BLUETOOTH beacons BT1-BT3, RSSI values included in the broadcasts from BLUETOOTH beacons BT1-BT3, etc. This information may be used by the client devices WB1-WB3 and/or the database(s) 802 to update stored roaming tables at the database(s) 802 and/or the client devices WB1-WB3. Although FIG. 8 illustrates three access points, three client devices, three BLUETOOTH beacons, and two databases, other embodiments may include more or less of each component.

An exemplary embodiment of a method for providing cooperative roaming for one or more client devices in a wireless network includes positioning one or more BLUETOOTH nodes in one or more wireless networks. Each BLUETOOTH node has a stored node roam table and is configured to transmit node roam table data including information related to potential access points of one or more wireless networks to one or more client devices. Alternatively, or in addition, the BLUETOOTH node (e.g., BLE beacon) may broadcast a unique UUID which may be used as a lookup to locate the roam table information on a server. This allows the one or more client devices to update their stored client roam tables based on the transmitted node roam table data. The method may also include positioning one or more of the client devices within a range of communication with the one or more BLUETOOTH nodes and the one or more access points of the one or more wireless networks. The one or more client devices may each have a stored client roam table and may be configured to receive node roam table data from the one or more BLUETOOTH nodes and store the received node roam table data in their stored client roam tables.

A further exemplary embodiment includes a method of cooperative roaming in a wireless network. In this example, the method includes receiving, at a BLUETOOTH node having a stored node roam table, client roam table data from a first client device. The client roam table data includes information relative to one or more potential access points of the wireless network. Also in this example, the method also includes updating the stored node roam table based on the received client roam table data, and transmitting the updated node roam table data to a second client device. This allows the second client device to update its stored client roam table.

The method may further include receiving, at the second client device, the updated node roam table data from the BLUETOOTH node, storing the received node roam table data in the client roam table of the second client device, scanning, at the second client device, for additional access points in the one or more wireless networks, and when the scan result data is different from the received roam table data, transmitting the scan result data to the BLUETOOTH node. When the scan result data is not different from the received roam table data, the method may include receiving additional node roam table data from the BLUETOOTH node.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cooperative scan and roam BLUETOOTH system comprising:
   one or more BLUETOOTH nodes configured to transmit node roam table data or a universally unique identifier (UUID) to one or more client devices, the one or more client devices each having a stored client roam table and connected to at least one of multiple access points of a wireless network;
   thereby allowing the one or more client devices to update their stored client roam tables wherein, when node roam table data is transmitted, the stored client roam tables are updated based on the transmitted node roam table data, and wherein, when a UUID is transmitted, the stored client roam tables are updated based on roam table information obtained from a server according to the transmitted UUID, or are updated based on roam table information obtained from a cache including multiple roam tables according to the transmitted UUID;
   wherein the one or more client devices are configured to receive the node roam table data from the one or more BLUETOOTH nodes, the server and/or the cache, and store the received node roam table data in their client roam tables; and
   wherein the one or more client devices are configured to scan the one or more wireless networks to detect additional access points in the one or more wireless networks, compare scan result data to the received node roam table data, and when the scan result data is different from the received roam table data, transmit the scan result data to the one or more BLUETOOTH nodes.

2. The system of claim 1, wherein the transmitted node roam table data includes at least one of a network identifier, a list of potential access points corresponding to the network identifier, a channel corresponding to a potential access point, and a link quality metric corresponding to a potential access point, the link quality metric indicative of a roam quality of the corresponding potential access point.

3. The system of claim 1, wherein the stored client roam table data includes at least one of a roam utility indicative of a roam quality of an access point, a media access control address of the access point, a signal strength of the access point, a rate of change of the signal strength of the access point, a previous signal strength value of the access point, and a location of origin of client roam table data.

4. The system of claim 1, wherein:
   the one or more BLUETOOTH nodes comprise BLUETOOTH low energy (BLE) beacons; and
   the client devices are configured to each use a lookup table of said client device to obtain roam table information from a server or a cache including multiple roam tables, based on an identifier reference.

5. The system of claim 1, wherein the one or more client devices comprise a BLUETOOTH communication module and a wireless network communication module.

6. The system of claim 1, wherein the one or more BLUETOOTH nodes are configured to receive client roam table data from at least one of the one or more client devices and update a stored node roam table based on the received client roam table data.

7. The system of claim 1, wherein the one or more BLUETOOTH nodes include a wireless network client, each of the one or more BLUETOOTH nodes configured to scan for potential access points of the one or more wireless networks and update a stored node roam table of said BLUETOOTH node based on scan result data obtained from the scan for potential access points.

8. The system of claim 1, wherein the one or more BLUETOOTH nodes are configured to receive node roam table data manually input by a user.

9. The system of claim 1, wherein when the scan result data is not different from the received roam table data, the one or more client devices are configured to receive additional node roam table data from the one or more BLUETOOTH nodes.

10. The system of claim 1, wherein the one or more client devices are configured to connect to a different access point in the wireless network by roaming based on the received node roam table data.

11. The system of claim 1, wherein the one or more client devices are configured to perform a roam using the received node roam table data.

12. The system of claim 1, wherein a first client device of the one or more client devices is configured to cooperatively share stored client roam table data with a second client device of the one or more client devices by transmitting the stored client roam table data of the first client device to the one or more BLUETOOTH nodes, thereby updating the stored node roam table of the one or more BLUETOOTH nodes, and the second client device is configured to receive the updated node roam table data from the one or more BLUETOOTH nodes.

13. The system of claim 1, wherein the one or more BLUETOOTH nodes include a first BLUETOOTH node having a first stored node roam table and positioned in a first location relative to the one or more wireless networks and a second BLUETOOTH node having a second stored node roam table and positioned in a second location relative to the one or more wireless networks which is different from the first location, the second BLUETOOTH node configured to transmit second node roam table data to the one or more client devices, thereby allowing the one or more client devices to update their stored client roam tables based on the transmitted second node roam table data.

14. A method of providing cooperative roaming for one or more client devices in a wireless network, the method comprising:
  positioning one or more BLUETOOTH nodes in one or more wireless networks, each BLUETOOTH node configured to transmit node roam table data or a universally unique identifier (UUID) to one or more client devices, the one or more client devices each having a stored client roam table;
  thereby allowing the one or more client devices to update their stored client roam tables wherein, when node roam table data is transmitted, the stored client roam tables are updated based on the transmitted node roam table data, and wherein, when a UUID is transmitted, the stored client roam tables are updated based on roam table information obtained from a server according to the transmitted UUID, or are updated based on roam table information obtained from a cache including multiple roam tables according to the transmitted UUID;
  wherein the one or more client devices are configured to receive the node roam table data from the one or more BLUETOOTH nodes, the server and/or the cache, and store the received node roam table data in their client roam tables; and
  wherein the one or more client devices are configured to scan the one or more wireless networks to detect additional access points in the one or more wireless networks, compare scan result data to the received node roam table data, and when the scan result data is different from the received roam table data, transmit the scan result data to the one or more BLUETOOTH nodes.

15. The method of claim 14, further comprising positioning one or more of the client devices within a range of communication with the one or more BLUETOOTH nodes and the potential access points of the one or more wireless networks, the one or more client devices configured to receive node roam table data from the one or more BLUETOOTH nodes and store the received node roam table data in their client roam tables, and to roam to a different access point in the wireless network as needed based on the received node roam table data.

16. The method of claim 14, further comprising:
  receiving, at one of the one or more BLUETOOTH nodes, client roam table data from a first one of the one or more client devices, the client roam table data including information relative to one or more potential access points of the wireless network, the one of the one or more BLUETOOTH nodes having a stored node roam table;
  updating the stored node roam table based on the received client roam table data; and
  transmitting the updated node roam table data to a second one of the one or more client devices, thereby allowing the second one of the one or more client devices to update its stored client roam table.

17. The method of claim 16, further comprising:
  receiving, at the second one of the one or more client devices, the updated node roam table data from the one of the one or more BLUETOOTH nodes;
  storing the received node roam table data in the stored client roam table of the second one of the one or more client devices;
  scanning, at the second one of the one or more client devices, for additional access points in the one or more wireless networks; and
  when the scan result data is different from the received node roam table data, transmitting the scan result data to the one of the one or more BLUETOOTH nodes.

18. The method of claim 17, further comprising roaming, at the second one of the one or more client devices, to a different access point of the wireless network based on the received node roam table data.

* * * * *